US008863795B2

(12) United States Patent
Knispel

(10) Patent No.: US 8,863,795 B2
(45) Date of Patent: Oct. 21, 2014

(54) GRIPPING EDGES FOR WINTER TIRE

(75) Inventor: Oliver Knispel, Gelnhausen-Hailer (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 950 days.

(21) Appl. No.: 12/915,085

(22) Filed: Oct. 29, 2010

(65) Prior Publication Data

US 2012/0103491 A1    May 3, 2012

(51) Int. Cl.
*B60C 11/11*    (2006.01)
*B60C 11/12*    (2006.01)
*B60C 11/03*    (2006.01)
*B60C 11/13*    (2006.01)

(52) U.S. Cl.
CPC ......... *B60C 11/0302* (2013.04); *B60C 11/1376* (2013.04); *B60C 2011/1213* (2013.04); *B60C 11/11* (2013.01); *B60C 11/12* (2013.01); *B60C 2011/1245* (2013.04); *B60C 2011/0369* (2013.04); *B60C 2011/133* (2013.04); *Y10S 152/03* (2013.01)
USPC ............ 152/209.15; 152/209.18; 152/209.21; 152/DIG. 3

(58) Field of Classification Search
CPC   B60C 11/11; B60C 11/12; B60C 2011/1213; B60C 11/1376
USPC .............. 152/209.15, 209.18, 209.21, DIG. 3
See application file for complete search history.

(56) References Cited

U.S. PATENT DOCUMENTS 5,031,680 A * 7/1991 Kajikawa et al. ........ 152/209.21
5,386,861 A * 2/1995 Overhoff et al. ......... 152/209.21
2006/0151078 A1 7/2006 Colombo et al. .......... 152/209.8
2007/0240801 A1* 10/2007 Tanaka ..................... 152/209.21
2008/0271827 A1* 11/2008 Morrison et al. ........ 152/209.25

FOREIGN PATENT DOCUMENTS

| EP | 485883 | 5/1992 | ............. B60C 11/11 |
| EP | 609195 | 8/1994 | ............. B60C 11/03 |
| EP | 775600 | 5/1997 | ............. B60C 11/03 |
| GB | 460338 A | * 1/1937 | |
| JP | 08-332810 A | * 12/1996 | |
| JP | 11-048720 A | * 2/1999 | |
| JP | 2003-025334 A | * 1/2003 | |

(Continued)

OTHER PUBLICATIONS

Machine translation for Japan 2005-231600 (no date).*

(Continued)

*Primary Examiner* — Steven D Maki
(74) *Attorney, Agent, or Firm* — Richard B. O'Planick

(57) ABSTRACT

A vehicle wheel tire includes a tire tread having a circumferential center tread region in which block elements are arranged in a symmetric pattern on opposite sides of a tire circumferential equatorial centerplane. The tread has one or more circumferential grooves bounded by edges of opposing block elements, pairs of opposed block elements having a block edge facing the groove and an array of saw-teeth formed along the groove-facing edge of opposed block elements inclined in the radial direction. The saw-teeth on a block edge of one opposed block element incline in a direction opposite to the inclination direction of saw-teeth on opposite opposed block element. A block element on the center tread region side of the groove has multiple circumferentially spaced apart and laterally extending sipes extending across the block element. The sipes extend to and align with the array of saw-teeth along the groove-facing edge of the block element.

10 Claims, 11 Drawing Sheets

(56) References Cited

FOREIGN PATENT DOCUMENTS

| | | | | |
|---|---|---|---|---|
| JP | 2003-165311 | | 6/2003 | .............. B60C 11/11 |
| JP | 2005-014644 A | * | 1/2005 | |
| JP | 2005-231600 A | * | 9/2005 | |
| JP | 2006-224791 A | * | 8/2006 | |

OTHER PUBLICATIONS

Machine translation for Japan 2005-014644 (no date).*
Machine translation for Japan 2003-025334 (no date).*
Machine translation for Japan 08-332810 (no date).*
European Search Report completed Jan. 31, 2012.

* cited by examiner

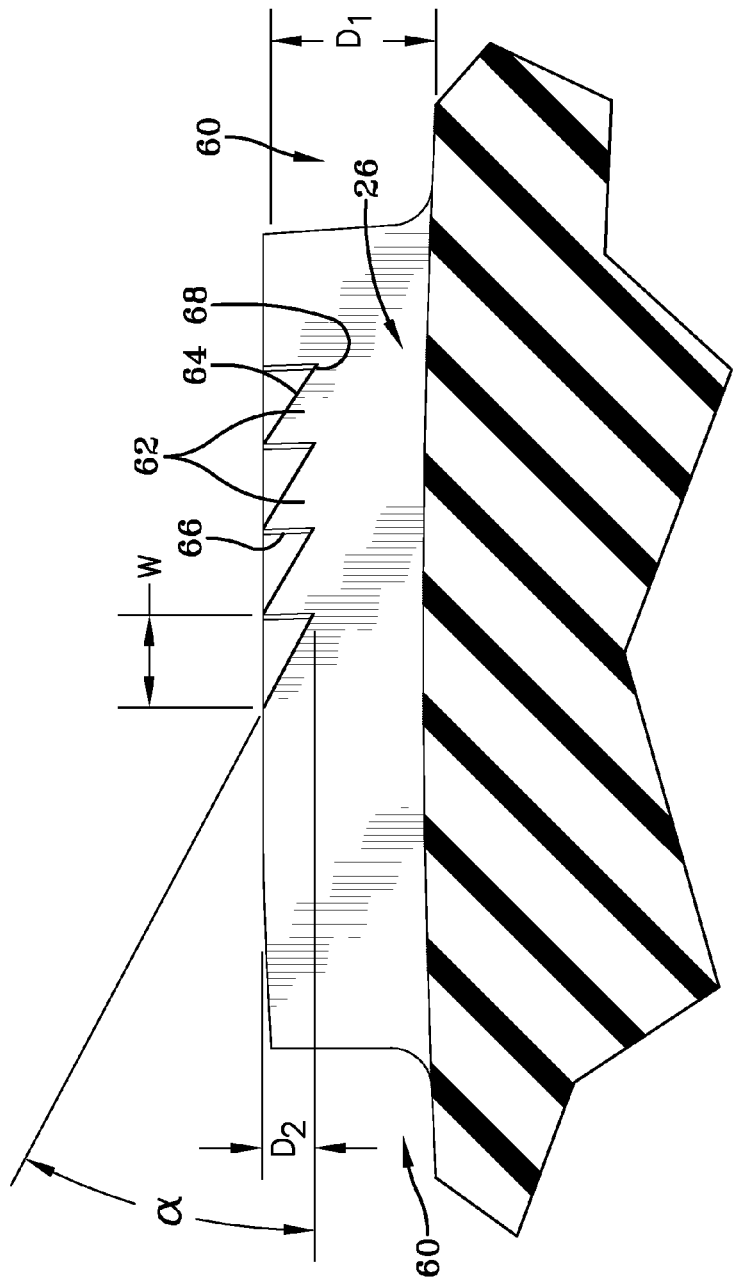

GRIPPING EDGES FOR WINTER TIRE

FIELD OF THE INVENTION

The invention relates generally to vehicle tires and, more specifically, to a center tread pattern for tires of a winter type.

BACKGROUND OF THE INVENTION

Winter tires constructed for winter driving conditions are intended to be suitable for running on surfaces of reduced compactness such as snow-covered roadways. Such tires are required to demonstrate suitable traction (gripping), power, braking, and handling characteristics while demonstrating good dry road, wear, and noise level performance. The tread pattern of winter tires must meet such competing objectives in order to provide the user with acceptable tire performance.

SUMMARY OF THE INVENTION

According to an aspect of the invention, a vehicle wheel tire includes a tire tread having a circumferential center tread region in which block elements are arranged in a symmetric pattern on opposite sides of a tire circumferential equatorial centerplane. The tread has one or more circumferential grooves bounded by edges of opposing block elements, each opposed block element having a block edge facing the groove. An array of saw-teeth are formed along each block edge inclined in the radial direction, with the saw-teeth on a block edge at one side of the groove being inclined in a direction opposite from the inclination of saw-teeth on a block edge at the opposite second side of the groove. According to a further aspect, the saw-teeth have a tooth depth between 2 to 3 millimeters.

In another aspect, a block element on the center tread region side of the groove has multiple circumferentially spaced apart and laterally extending sipes extending across the block element. The sipes extend to the array of saw-teeth along the groove-facing edge of the block element. The number of sipes preferably although not necessarily equal the number of saw-teeth along the block edge and the sipes align with respective saw-teeth spacing along the block edge.

Definitions

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 7A is a partial section view of a tread portion taken along the line 7A-7A of FIG. 4.

DETAILED DESCRIPTION OF THE INVENTION

Figure 1:
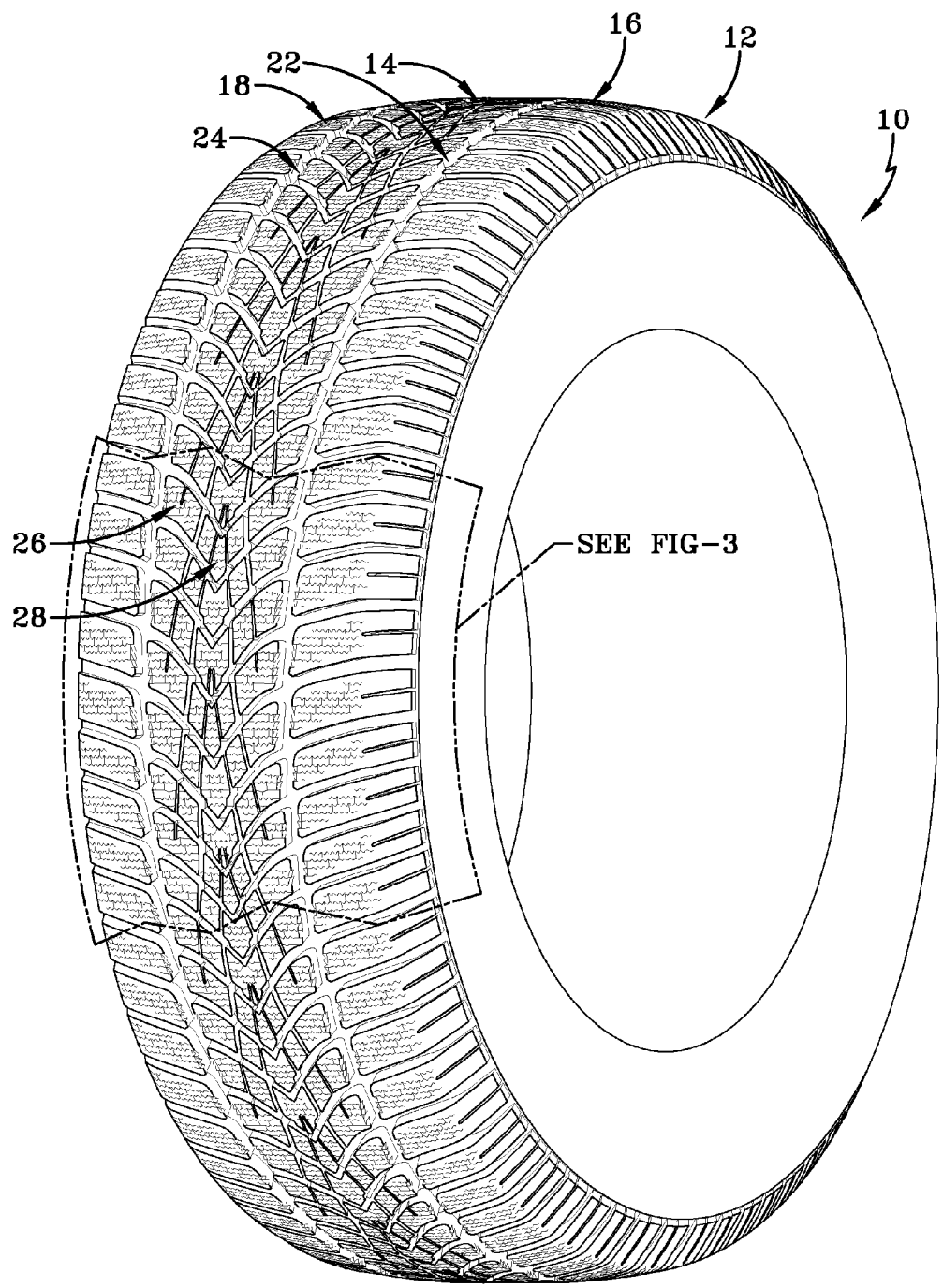
FIG. 1 is a isometric view of a tire including a tire tread.
Figure 2:
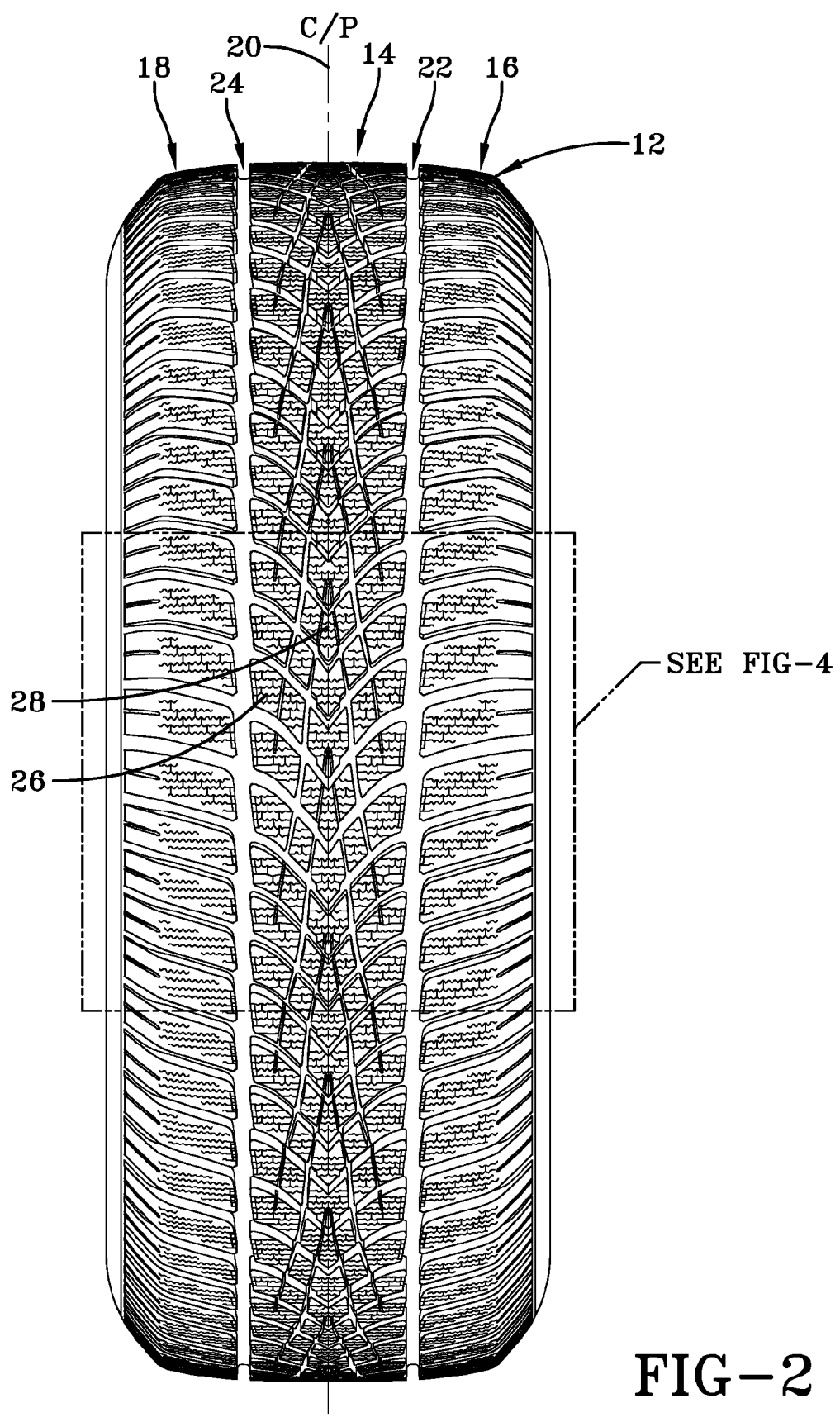
FIG. 2 is a plan view of the tire tread.
Figure 3:
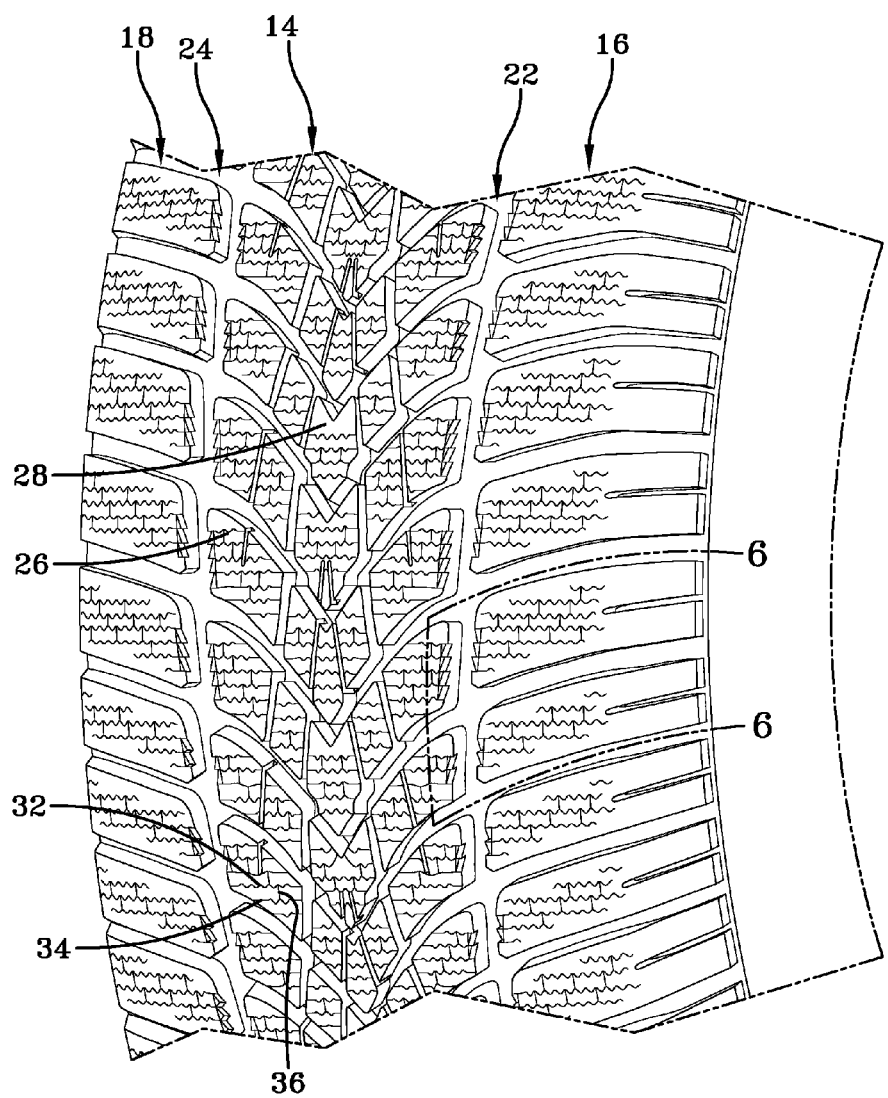
FIG. 3 is an enlarged isometric view of a tread portion identified in FIG. 1.
Figure 4:
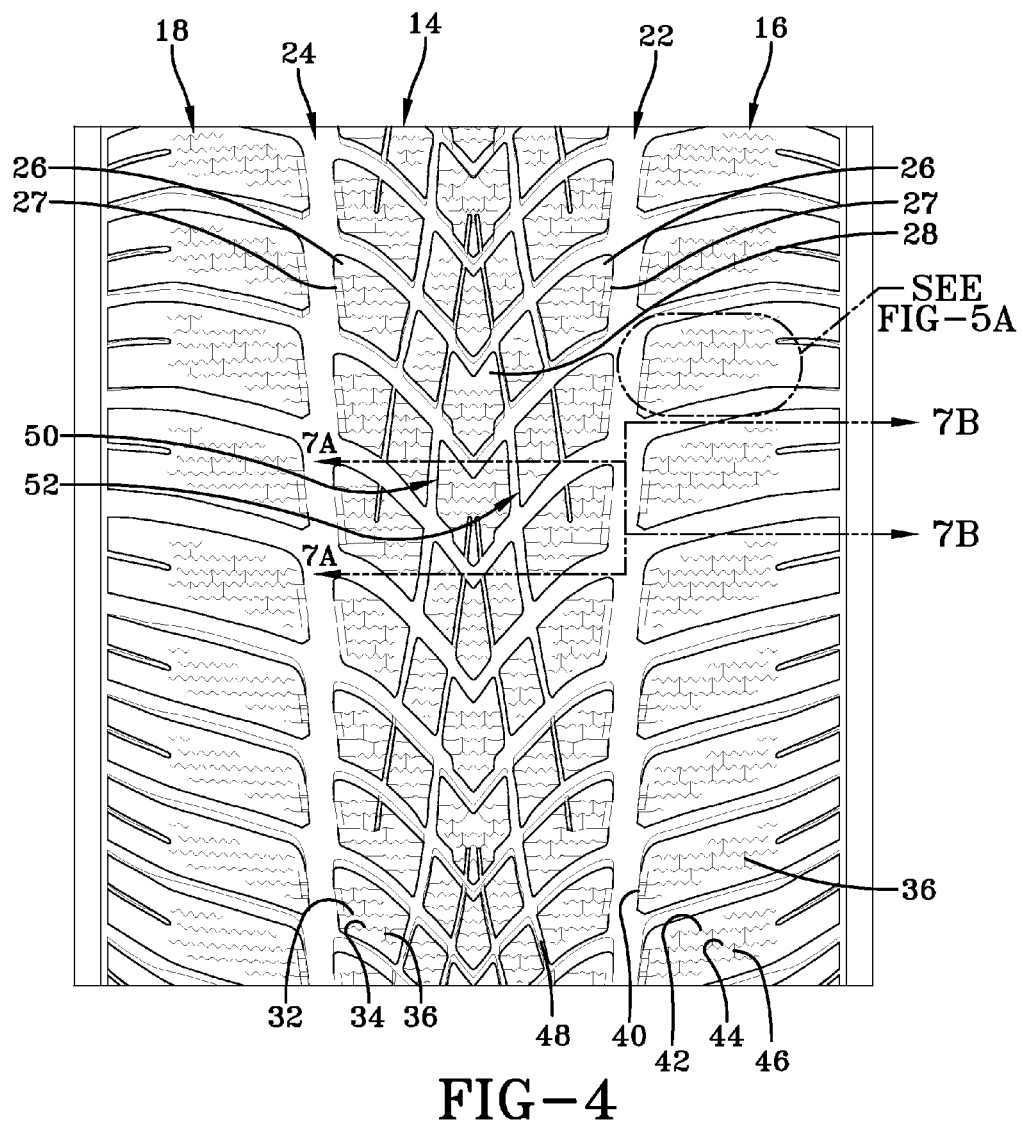
FIG. 4 is an enlarged isometric view of a tread portion identified in FIG. 2.

With initial reference to FIGS. 1, 2, 3, and 4, a tire 10 is provided having a circumferential tread 12. The tread 12 includes a circumferential center tread region 14 and two shoulder tread regions 16, 18 on opposite sides of center region 14. A tire equatorial centerplane 20 divides the tread 12 into two symmetrical halves. A pair of circumferential grooves 22, 24 bound the center tread region 14, separating the center region from opposite shoulder tread regions 16, 18.

Figure 5A:
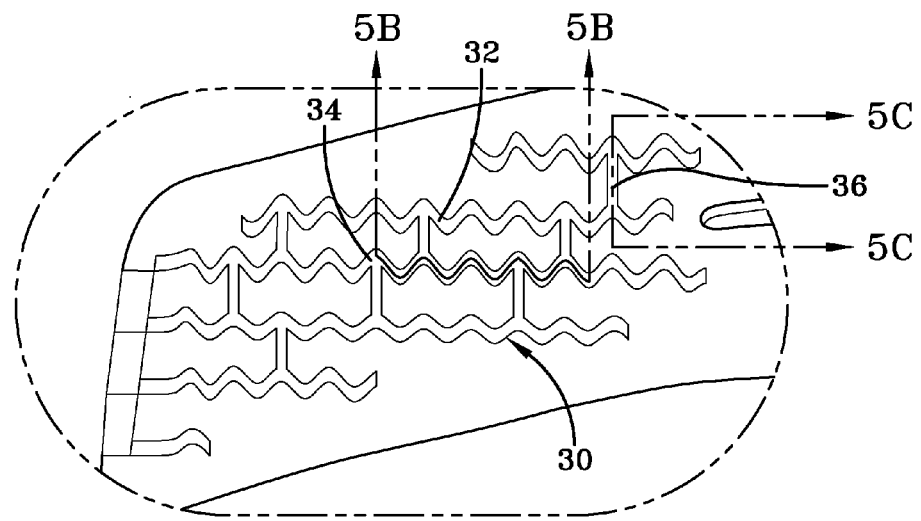
FIG. 5A is an enlarged view of the siping and notch pattern in center tread blocks.

In the symmetrical pattern of the tread 12 shown, the center region 14 includes off-center block elements 26 of sundry geometric shape on opposite sides of the centerplane 20, outer off-center block elements 26 having a groove-facing side 27 that borders a respective circumferential groove 22 or 24. The center region 14 further includes interior on-center block elements 28 of sundry geometric configuration located generally on the circumferential centerplane 20. Some or all of the center region block elements, including selective on-center blocks 28 and off-center blocks 26, include multiple sinusoidal or wavy sipes 30 that run in a mutually spaced apart and parallel orientation laterally across a respective block element. Sipes 30 are generally of a wavy, undulating, or sinusoidal configuration having a variable depth in the lengthwise direction that varies from deeper recessed sipe portions to sipe portions that are not recessed as will be explained below. Adjacent pairs of laterally extending wavy sipes 32, referred for illustration generally as sipes 32, 34, are interconnected by one or more circumferentially extending notches 36. The notches 36 are generally of linear straight-side constant depth configuration, extending circumferentially to interconnect a pair of adjacent wavy sipes at a medial sipe intersection location as shown in FIG. 5.

The shoulder tread regions 16, 18 are formed by block elements 38 having an axially inward facing side 40 adjoining a respective circumferential tread groove 22, 24. The shoulder block elements 38 may at the user's election include multiple sinusoidal or wavy sipes 42, 44 configured similarly to the sipes 30 of the center region 14. The shoulder sipes 42, 44 likewise run in a mutually spaced apart and parallel orientation laterally across a respective shoulder block element and have a variable depth in the lengthwise direction that varies from deeper recessed sipe portions to sipe portions that are not recessed. The adjacent wavy sipes 42, 44 are interconnected by one or more circumferentially extending notches 46. The notches 46 are generally of linear straight-side constant depth configuration, extending circumferentially to interconnect a pair of adjacent wavy sipes at a medial sipe intersection location.

Figure 8:
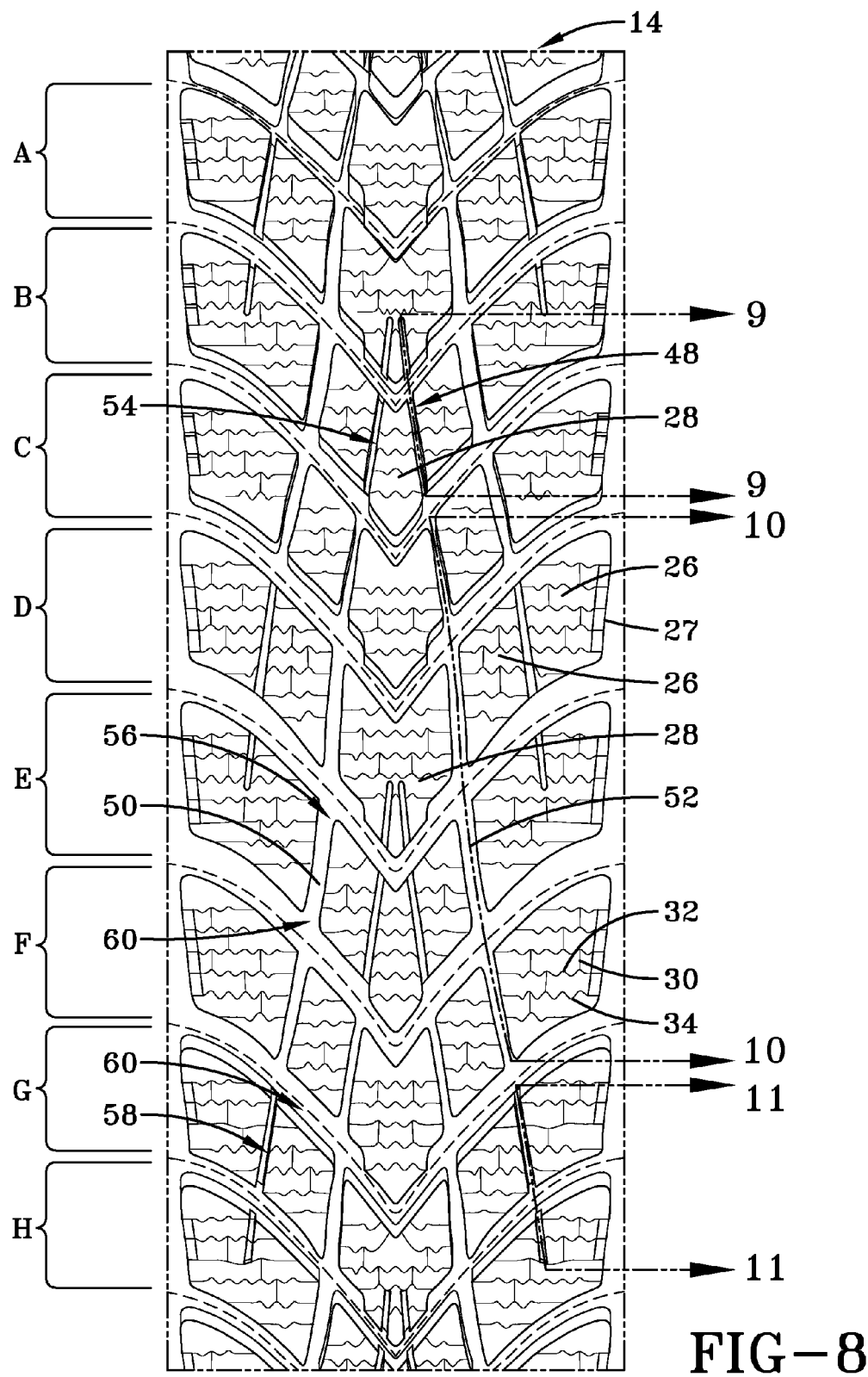
FIG. 8 is a plan view of a portion of the tread center region.

Referring to FIGS. 4, 8, 9, 10, and 11, a circumferential array of spaced apart first V-grooves on the tread centerplane 20. Each of the first V-grooves includes divergent first groove arm 50 and second groove arm 52. Each of the groove arms 50, 52 have a vertex segment 54, a medial segment 56, and a terminal segment 58. The groove arms 50, 52 are of variable width and depth from the vertex segment 54 to the medial segment 56, to the terminal segment 58. The depth of the groove arms 50, 52 are shallowest at the segments 54, 58 and deepest at the medial segment 56. The width of the groove arms 50, 52 is narrowest at the segments 54, 58 and widest at the medial segment. The ends of the groove arms 50, 52 converge but do not meet in the vertex region of each arm as shown in FIG. 8.

Figure 10:
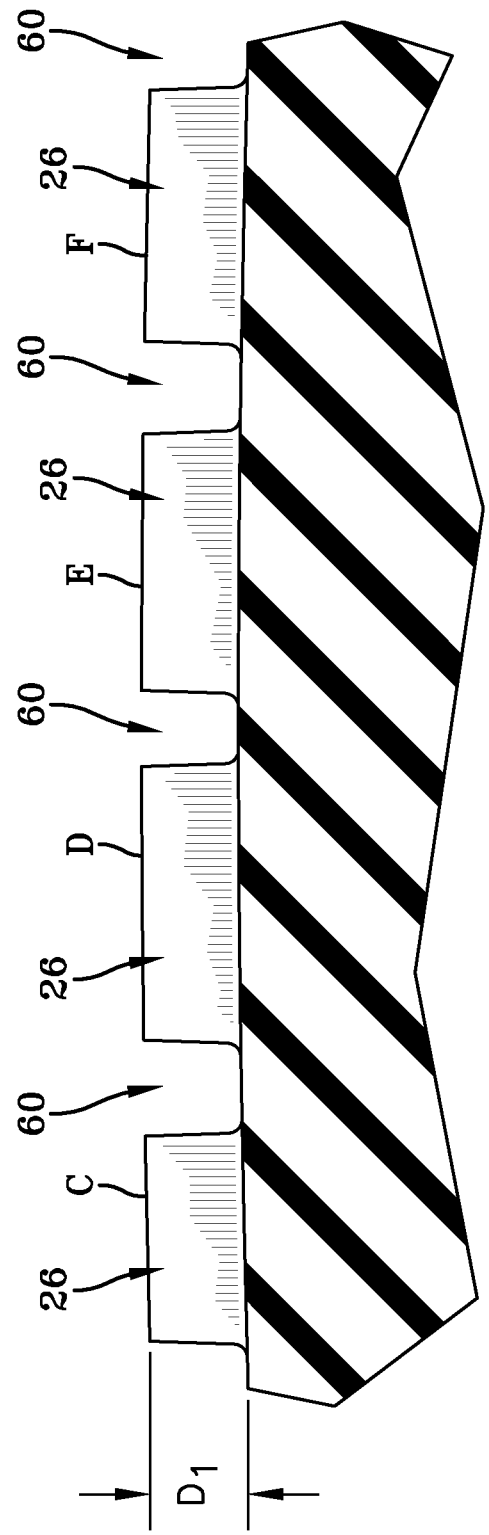
FIG. 10 is a partial section view through the tread center region taken along the line 10-10 of FIG. 8.

A circumferential array of spaced apart second, smaller dimensioned, V-grooves 60 extend about the tread center region symmetric with the centerplane 20. Each of the second V-grooves 60 within the array is oriented in an opposite circumferential direction from the array of first V-grooves 48 on the tread centerplane 20. Each of the second V-grooves 60 include divergent groove legs extending from a vertex segment and each groove 60 is generally semi-circular in section and preferably at a constant depth along the groove. FIG. 10 illustrates in section the configuration of second V-grooves 60 within regions C, D, E and F as those regions are identified in FIG. 8.

Figure 9:
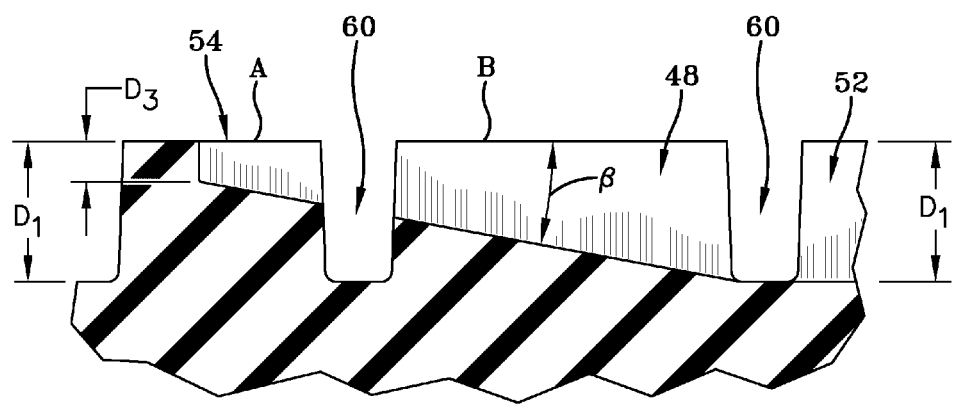
FIG. 9 is a partial section view through the tread center region taken along the line 9-9 of FIG. 8.
Figure 11:
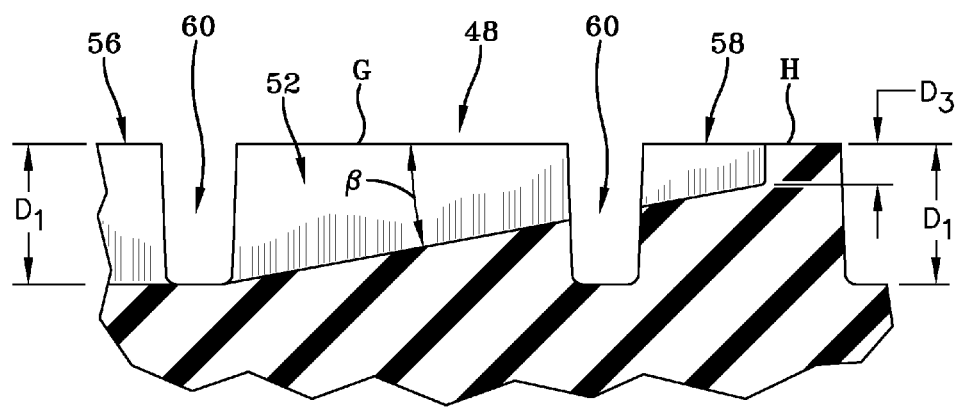
FIG. 11 is a partial section view through the tread center region taken along the line 11-11 of FIG. 8.

The repeating circumferential array of first V-shaped grooves positioned on the centerplane overlap the array of second V-shaped grooves in such a way that one first V-groove 48 is overlapped by about 6 to 9 second V-grooves 60. FIG. 8 illustrates the center tread region 14 broken into regions A through H for illustration purposes. FIG. 9 shows the first V-groove 48 arm configuration within region A of the center tread (FIG. 8), that being the vertex segment 54 of the arms 50, 52. It will be appreciated as shown that the first V-groove arms 50, 52 have a varying lengthwise depth that varies between about 2 and 7 millimeters from a shallower depth D3 at the vertex arm segment 54 to an increased depth D1 at the medial arm segment 56 back to a decreased depth D3 at the terminal arm segment 58. The shallow depth D3 at arm segments 54, 58 is approximately 2 millimeters. The groove 48 deepens at an angle β of approximately 45 degrees through regions B, C of FIG. 8 to a maximum depth of 7 millimeters in the medial segment 56 of the groove arms represented by regions D, E in FIG. 8. From medial section 56, the groove arm depth inclines (regions F, G, H of FIG. 8) back to a depth D3 of 2 millimeters at the terminal arm end 58 as shown in FIG. 11.

In addition to the variable depth within the first V-grooves 48, the width of the first V-groove arms 50, 52 varies between the vertex segment 54, medial segment 56, and terminal segment 58. The arms 50, 52 of each V-groove 48 at the vertex and terminal ends is narrower, approximately 1 to 3 millimeters. In the medial segment 56, the groove arms 50, 52 widen to 3 to 8 millimeters or generally two times the minimum width at the ends. As the arms 50, 52 of each first V-groove 48 are deep and small in width at the vertex and terminal ends and become shallower but broader in the middle, the containment volume of the groove arms per length unit remains constant.

Referring to FIGS. 3, 6, 7A, and 7B, the off center block elements 26 have along an upper edge 63 of the side 27 a series of saw-teeth 62 of generally right triangular sectional configuration. Each of the saw-teeth 62 are inclined along surface 64 at an angle α of approximately 45 degrees to intersect surface 66. Adjacent saw-teeth meet at intersection 68. On the opposite side of the grooves 22, 24, the shoulder lugs 38 likewise have a series of saw-teeth 76 that are directed into a respective groove. The shoulder lug saw-teeth 76 are inclined at angle α in an opposite radial direction as the saw-teeth 62. Saw-teeth 76 include inclined surface 78 which meets tooth side 80. Adjacent saw-teeth 76 meet at intersection 82. The inclination angle of teeth 62, 76 is approximately 45 degrees. The saw-teeth 62, 76 are approximately 2 to 3 mm in depth D2 and are spaced apart a distance W of approximately 5 millimeters. The saw-teeth 62, 76 are inclined in the radial direction with the inclination of teeth on one side of the groove being in the opposite radial direction than on the other side of the groove 22, 24. The opposite radial inclination of the saw-teeth on opposite sides of the grooves acts to increase grip on snow surfaces. The number of the saw-teeth is preferably the same as the number of the lateral, preferably wavy sipes in the respective tread block. The saw-teeth are preferably also aligned with respect aligned at intersections 68, 82 with respective wavy sipes extending across each block.

Figure 6:
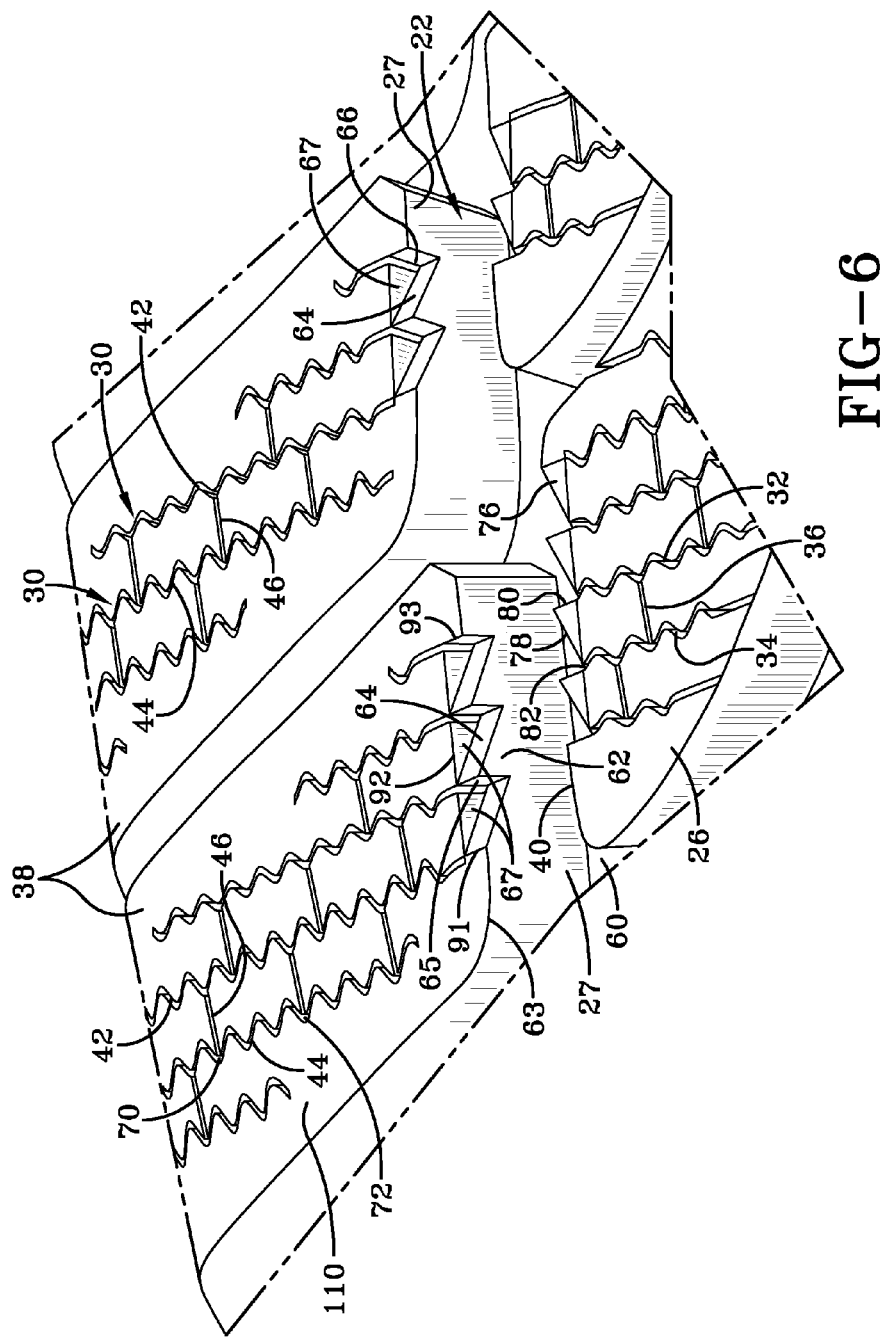
FIG. 6 is a partial perspective view of a tread portion taken along the line 6-6 of FIG. 3.
Figure 7B:
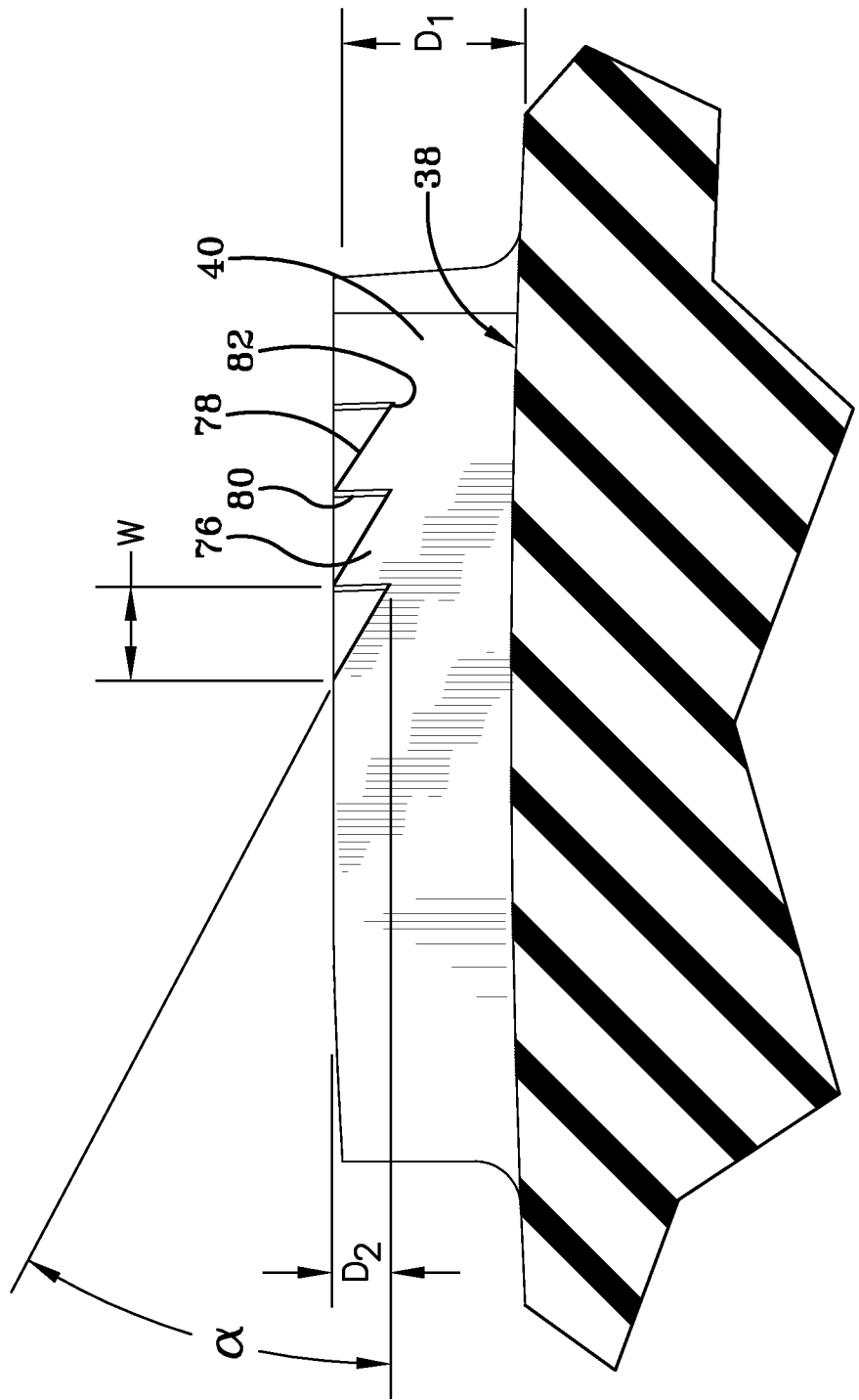
FIG. 7B is a partial section view of a tread portion taken along the line 7B-7B of FIG. 4.

As can be seen from FIG. 6, shoulder block element 38 comprises an upper block edge 63 between an upper block surface 110 and a side block surface 27, the upper block surface 110 of the shoulder block element 38 being at a tread surface of the tire tread, the side block surface 27 of the shoulder block element 38 defining part of one groove wall surface of the circumferential groove 22 and extending toward the bottom of the circumferential groove 22, and the upper block edge 63 of the shoulder block element 38 being indented such that, at the upper block surface 110 of the shoulder block element 38, the indented edge comprises a main edge 92 connecting a pair of end edges 91, 93. Furthermore, the shoulder block element 38 comprises an array of saw-teeth 62 extending between the pair of end edges 91, 93 of the indented edge of the shoulder block element 38, the array of saw-teeth 62 comprising a tooth having a first surface 64, a second surface 65 and a third surface, the first surface 64 extending to the tread surface and being inclined with respect to the radial direction, the second surface 65 being a tooth side surface and the third surface defining part of the side block surface 27 of the shoulder block element 38, wherein an indented surface 67 spaced in the axial direction from the side block surface 27 of the shoulder block element 38 is formed between an inclined surface 64 of the saw-teeth 62 and the main edge 92 of the indented edge of the shoulder block element 38.

Figure 5B:
FIG. 5B is a section view through a sipe taken along the line 5B-5B of FIG. 5A.
Figure 5C:
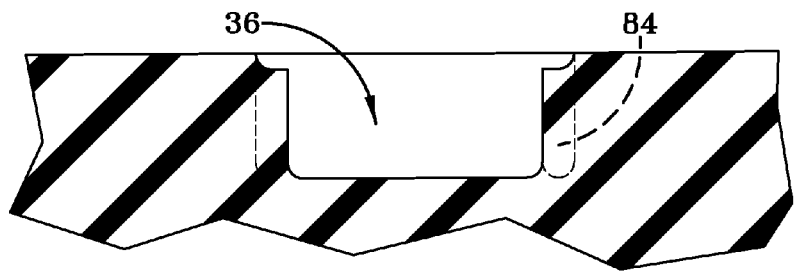
FIG. 5C is a section view through a notch taken along the line 5C-5C of FIG. 5A.

With continued reference to FIGS. 3, 5A, 5B, 5C, 6, 7A, and 7B, adjacent wavy sipes in the center and shoulder tread blocks extend in a generally axial lateral direction and may be connected by one or more circumferential notches. The notches 36 (center tread region) and 46 (shoulder blocks) are generally rectangular in section and of a constant depth as shown by FIG. 5C. The wavy sipes 30 (center tread region blocks) and 42, 44 (shoulder blocks) have a sectional configuration shown in FIG. 5B. Straight circumferentially oriented notches 36, 46 interconnect adjacent axially oriented wavy sipes 30, 42, 44. Included in the sipe configuration are semi-circular shaped cuts or recesses 84. The recesses 84 are located such that the notches 36 interconnect a pair of adjacent wavy sipes at opposite notch ends 70, 72 at non-recessed sipe regions rather than at the recessed regions 84. In so doing, the notches meet the sipes at locations where there is no recess 84. The depth of the notch and the sipes intersected thereby is generally the same as shown by FIGS. 5B and 5C.

From the foregoing, it will be appreciated that the vehicle wheel tire includes a tire tread 12 having a circumferential center tread region 14 in which block elements (e.g. 26, 28) are arranged in a symmetric pattern on opposite sides of a tire circumferential equatorial centerplane 20. The advantage of a symmetrically configured tire tread to a user is to simplify orientation and positional issues in the mounting of the tire to a vehicle. The symmetrically disposed block elements on opposite sides of the centerplane have a plurality of spaced apart and laterally extending wavy sipes 30 extending across the block element. Selective pairs of adjacent sipes (e.g. 32, 34) are interconnected by one or more circumferentially oriented notches 36.

The opposite lateral sides of the center tread region 14 are bounded respectively by the circumferential grooves 22, 24; the grooves representing the sole grooves within respective halves of the tire tread. Moreover, the notches 36 within the tire tread are confined to the center tread region 14.

The notches 36 and 46 always link two adjacent and parallel preferably wavy sipes. In order not to weaken the tread or render the tread too soft, the notches meet the sipes in non-recessed regions of the sipes. The notches further improve tread performance in providing improved side-rip in winter conditions and better comfort at dry handling.

It will further be noted from the foregoing that the tread has improved traction characteristics achieved through bounding one or more circumferential grooves by saw-tooth edges of opposing block elements. Each opposed block element provides a block edge facing the groove with the array of saw-teeth formed along each block edge inclined in the radial direction. Preferably, the saw-teeth on a groove-facing block edge of a center tread region block element(s) incline in a direction opposite from the inclination of saw-teeth on a groove-facing edge of a block element on the opposite second side of the groove. Preferably, the sipes extend across the center tread region block element to the array of saw-teeth along the groove-facing edge of the block element. The number of sipes preferably although not necessarily equal the number of saw-teeth along the block edge and align with respective saw-teeth spacing along the block edge. The block elements on opposite adjacent sides of the groove have saw-teeth inclining in opposite directions for improved gripping or traction.

The repeating circumferential array of first V-shaped grooves positioned on the centerplane and the repeating circumferential array of oppositely oriented second V-shaped grooves provided improved traction and gripping. The first V-grooves have a varying lengthwise depth that varies between about 2 and 7 millimeters from a shallower depth proximate to the vertex arm region to an increased depth at the medial arm region to a decreased depth at the terminal arm region. The width of the first V-groove arms further is varied from the vertex to the terminal ends and the varying depth and width of the first V-shaped groove arms from the vertex region to the terminal region make the containment volume of the groove arms per length unit constant.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A vehicle wheel tire comprising:
   a tire tread having a circumferential center tread region comprising a plurality of block elements arranged in a symmetric pattern on opposite sides of a tire circumferential equatorial centerplane, wherein the tread has at least one circumferential groove bounded by edges of opposing first and second block elements;

the first block element comprising an upper block edge between an upper block surface and a side block surface, the upper block surface of the first block element being at a tread surface of the tire tread, the side block surface of the first block element defining part of one groove wall surface of the circumferential groove and extending toward the bottom of the circumferential groove, the upper block edge of the first block element being indented such that, at the upper block surface of the first block element, the indented edge comprises a main edge connecting a pair of end edges, the first block element comprising a first array of saw-teeth extending between the pair of end edges of the indented edge of the first block element, the first array of saw-teeth comprising a tooth having a first surface, a second surface and a third surface, the first surface extending to the tread surface and being inclined with respect to the radial direction, the second surface being a tooth side surface and the third surface defining part of the side block surface of the first block element, wherein an indented surface spaced in the axial direction from the side block surface of the first block element is formed between an inclined surface of the first array of saw-teeth and the main edge of the indented edge of the first block element;

the second block element comprising an upper block edge between an upper block surface and a side block surface, the upper block surface of the second block element being at the tread surface of the tire tread, the side block surface of the second block element defining part of the other groove wall surface of the circumferential groove and extending toward the bottom of the circumferential groove, the upper block edge of the second block element being indented such that, at the upper block surface of the second block element, the indented edge comprises a main edge connecting a pair of end edges, the second block element comprising a second array of saw-teeth extending between the pair of end edges of the indented edge of the second block element, the second array of saw-teeth comprising a tooth having a first surface, a second surface and a third surface, the first surface extending to the tread surface and being inclined with respect to the radial direction, the second surface being a tooth side surface and the third surface defining part of the side block surface of the second block element, wherein an indented surface spaced in the axial direction from the side block surface of the second block element is formed between an inclined surface of the second array of saw-teeth and the main edge of the indented edge of the second block element.

2. The tire of claim 1, the saw-teeth having a tooth depth between 2 to 3 millimeters.

3. The tire of claim 1, wherein the first block element has a plurality of circumferentially spaced apart and laterally extending sipes extending across the first block element to the upper edge of the first block element.

4. The tire of claim 3, wherein the sipes extend to the main edge of the indented edge of the first block element.

5. The tire of claim 4, wherein the number of sipes equal the number of saw-teeth along the main edge of the indented edge of the first block element.

6. The tire of claim 5, wherein the sipes align with the lower edges of the inclined surfaces of the first array of saw-teeth.

7. The tire of claim 4, wherein the sipes align with the lower edges of the inclined surfaces of the first array of saw-teeth.

8. The tire of claim 1, wherein the saw-teeth are of substantially a right triangular sectional configuration wherein each inclined surface is oriented at the angle of substantially forty-five degrees with respect to a plane parallel to the tread surface.

9. The tire of claim 8, further comprising a plurality of axially directed sipes extending across each of the first and second block elements, each sipe intersecting a respective one of the array of saw-teeth of the first and second block elements.

10. The tire of claim 9, wherein each sipe in the plurality of axially directed sipes follows a wavy path to an intersection with a respective one of the array of saw-teeth.

* * * * *